(12) United States Patent
Wojciechowski

(10) Patent No.: US 12,598,144 B2
(45) Date of Patent: Apr. 7, 2026

(54) METHOD AND DEVICE FOR PROCESSING PACKET

(71) Applicant: Samsung Electronics Co., Ltd., Suwon-si (KR)

(72) Inventor: Łukasz Wojciechowski, Warsaw (PL)

(73) Assignee: Samsung Electronics Co., Ltd., Suwon-si (KR)

( * ) Notice: Subject to any disclaimer, the term of this patent is extended or adjusted under 35 U.S.C. 154(b) by 7 days.

(21) Appl. No.: 18/734,680

(22) Filed: Jun. 5, 2024

(65) Prior Publication Data

US 2025/0016102 A1     Jan. 9, 2025

Related U.S. Application Data

(63) Continuation of application No. PCT/KR2024/006905, filed on May 22, 2024.

(30) Foreign Application Priority Data

Jul. 7, 2023    (KR) ........................ 10-2023-0088196
Aug. 9, 2023    (KR) ........................ 10-2023-0104155

(51) Int. Cl.
*H04L 47/125*     (2022.01)
*H04L 47/24*     (2022.01)
*H04L 45/74*     (2022.01)

(52) U.S. Cl.
CPC ............ *H04L 47/125* (2013.01); *H04L 47/24* (2013.01); *H04L 45/74* (2013.01)

(58) Field of Classification Search
CPC ........ H04L 47/125; H04L 47/24; H04L 45/74
See application file for complete search history.

(56) References Cited

U.S. PATENT DOCUMENTS 6,519,737 B1    2/2003   Derby
8,352,829 B1 *  1/2013   Pathakota ........... H03M 13/093
                                                714/758

(Continued)

FOREIGN PATENT DOCUMENTS

CN      112306741 A     2/2021
CN      112350798 A     2/2021

(Continued)

OTHER PUBLICATIONS

Supriyanto, R. Budiarto, R. K. Murugesan and S. Ramadass, "CRC extension header (CEH): A new model to handle transmission error for IPv6 packets over fiber optic links," 2009, Kuala Lumpur, Malaysia, 2009, pp. 569-573 (Year: 2009).*

(Continued)

*Primary Examiner* — Messeret F Gebre
(74) *Attorney, Agent, or Firm* — Jefferson IP Law, LLP

(57)     ABSTRACT

A method for processing a packet by an electronic device is provided. The method includes identifying a first packet including a first part, a second part, and a cyclic redundancy check (CRC) part, obtaining a second value by modifying a first value of the first part of the first packet, obtaining a third value by performing an exclusive or (XOR) operation on the first value and the obtained second value, obtaining a fourth value which is a CRC value for the obtained third value, obtaining a fifth value which is a CRC value corresponding to concatenation of the third value and a number of zeros corresponding to a length of the second part of the first packet, based on the length of the second part of the first packet and the obtained fourth value, obtaining a sixth value by performing the XOR operation on a value of the CRC part of the first packet and the obtained fifth value, and generating a second packet including a first part having the second value, a second part which is the same as the second (Continued)

400a 410a   420a       430a

| x | CRC(A) | ... [not modified] ... |

Length N

↓

400b 410b   420b       430b

| y | CRC(B) | ... [not modified] ... |

Length N part of the first packet, and a CRC part having the sixth value.

20 Claims, 7 Drawing Sheets

(56) References Cited

U.S. PATENT DOCUMENTS

| | | | |
|---|---|---|---|
| 10,211,852 | B2 | 2/2019 | Mei et al. |
| 10,476,528 | B2 | 11/2019 | Li et al. |
| 2001/0027489 | A1 | 10/2001 | Miyamoto et al. |
| 2018/0123958 | A1 | 5/2018 | Ignatchenko |
| 2019/0150120 | A1 | 5/2019 | Sarkis et al. |
| 2019/0158219 | A1 | 5/2019 | Blankenship et al. |
| 2019/0173841 | A1 | 6/2019 | Wang et al. |
| 2020/0412649 | A1 | 12/2020 | Papadantonakis et al. |
| 2021/0352044 | A1* | 11/2021 | Asveren .............. H04L 61/2517 |
| 2022/0337682 | A1 | 10/2022 | Waskiewicz, Jr. et al. |

FOREIGN PATENT DOCUMENTS

| | | |
|---|---|---|
| CN | 113411380 A | 9/2021 |
| KR | 10-1859988 B1 | 5/2018 |
| KR | 10-2022-0164840 A | 12/2022 |
| WO | 2019/090468 A1 | 5/2019 |

OTHER PUBLICATIONS

E. Tsimbalo, X. Fafoutis and R. Piechocki, "Fix it, don't bin it!—CRC error correction in Bluetooth Low Energy," 2015 IEEE 2nd World Forum on Internet of Things (WF-IoT), Milan, Italy, 2015, pp. 286-290, (Year: 2015).*

Massimo Girondi et al., High-speed Connection Tracking in Modern Servers, Jul. 15, 2021.

What Is a Load Balancer_F5, 2024 https://www.f5.com/glossary/load-balancer.

What Is Load Balancing_ How Load Balancers Work_Nginx https://www.nginx.com/resources/glossary/load-balancing.

What is an Application Load Balancer—Elastic Load Balancing_AWS, 2024 https://docs.aws.amazon.com/elasticloadbalancing/latest/application/introduction.html.

Transport layer—Wikipedia https://en.wikipedia.org/wiki/Transport_layer.

Network layer—Wikipedia https://en.wikipedia.org/wiki/Network_layer.

What Is Layer 4 Load Balancing_NGINX Load Balancer_Nginx https://www.nginx.com/resources/glossary/layer-4-load-balancing/.

Cilium, eBPF-based Networking, Observability, Security https://cilium.io.

XDP Get started with XDP I Red Hat Developer https://developers.redhat.com/blog/2021/04/01/get-started-with-xdp#.

What is eBPF_ An Introduction and Deep Dive into the eBPF Technology_eBPF https://ebpf.io/what-is-ebpf/.

Andrew Kadatch et al., Everything we know about CRC but afraid to forget, CRC concatenation techniques.

Zlib CRC32 calculation https://github.com/madler/zlib/blob/master/crc32.c.

Compilation/disassembly tools https://github.com/llvm/llvm-project/.

International Search Report dated Aug. 30, 2024, issued in International Application No. PCT/KR2024/006905.

* cited by examiner

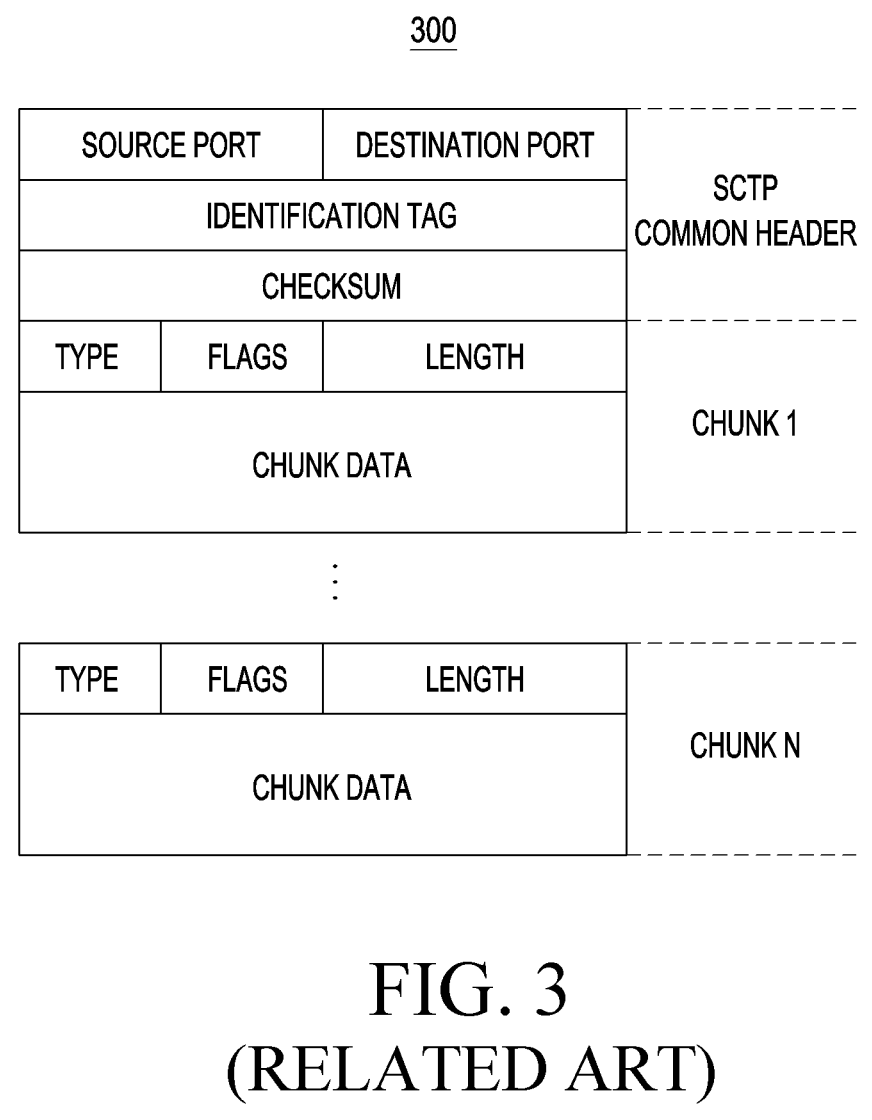

300

| SOURCE PORT | DESTINATION PORT | | SCTP COMMON HEADER |
|---|---|---|---|
| IDENTIFICATION TAG | | | |
| CHECKSUM | | | |
| TYPE | FLAGS | LENGTH | CHUNK 1 |
| CHUNK DATA | | | |

⋮

| TYPE | FLAGS | LENGTH | CHUNK N |
|---|---|---|---|
| CHUNK DATA | | | |

FIG. 3
(RELATED ART)

METHOD AND DEVICE FOR PROCESSING PACKET

CROSS-REFERENCE TO RELATED APPLICATION(S)

This application is a continuation application, claiming priority under § 365(c), of an International application No. PCT/KR2024/006905, filed on May 22, 2024, which is based on and claims the benefit of a Korean patent application number 10-2023-0088196, filed on Jul. 7, 2023, in the Korean Intellectual Property Office, and of a Korean patent application number 10-2023-0104155, filed on Aug. 9, 2023, in the Korean Intellectual Property Office, the disclosure of each of which is incorporated by reference herein in its entirety.

TECHNICAL FIELD

The disclosure relates to a method and device for processing packets. More particularly, the disclosure relates to changing part of the content of a packet.

BACKGROUND ART

The development of communication technology through the Internet leads to explosively increasing traffic. To respond to increasing traffic, service providers have a plurality of servers and properly distribute traffic to the servers considering the loads of the servers. A load balancer may be used for such traffic distribution.

FIG. 1 illustrates an example system using a load balancer according to the related art.

Referring to FIG. 1, a plurality of clients 110a, 110b, 110c, and 110d may be located in an external network 140, and a plurality of backend servers 130a, 130b, and 130c and a load balancer 120 may be located in an internal network 150. The load balancer 120 may distribute traffic from a plurality of clients 110a, 110b, 110c, and 110d to a plurality of backend servers 130a, 130b, and 130c considering the respective loads of the backend servers 130a, 130b, and 130c. For example, the load balancer 120 may distribute incoming traffic to the backend server that currently has the lowest load among the plurality of backend servers 130a, 130b, and 130c. This operation of the load balancer 120 may be referred to as load balancing.

Layer 4 protocols may include, e.g., a transmission control protocol (TCP), a user datagram protocol (UDP), and a stream control transmission protocol (SCTP). In layer 4 load balancing, protocol headers of open system interconnection (OSI) model layer 4 protocols are analyzed, and a balancing decision is made based on the contents of the protocol headers. In this case, the lower layer address assigned to the load balancer 120 is exposed to the external network 140, and network address translation (NAT) may apply in the internal network 150 including the plurality of backend servers 130a, 130b, and 130c.

The load balancer 120 may change the destination of packets in the traffic for traffic distribution. To that end, the load balancer 120 may change a part of the packet (e.g., the field indicating the destination of the packet).

FIG. 2 illustrates an example load balancer according to the related art.

When load balancing is performed, all packets are forwarded without being consumed by the load balancer. This means that all packets are processed by the network stack, copied to user space, and pass through the network stack again. The most time-consuming operations are context switching and packet copying between kernel and user space. Therefore, solutions, such as data plane development kit (DPDK) or express data path (XDP), are used to shorten the packet path. They may reduce CPU usage by up to 90%, thus making it possible to process more packets.

The XDP is the first hook in the Linux kernel to which an extended Berkeley packet filter (eBPF) or BPF may be attached to process incoming network packets. The use of eBPF makes it possible to quickly process packets while maintaining kernel context. However, eBPF programs have the following limitations.

Must be statically verified so that it does not crash or run indefinitely.

Must have a limited number of commands.

Unable to allocate memory.

Cannot have loops in an undefined scope.

FIG. 3 illustrates the structure of an example SCTP packet according to the related art.

The SCTP packet 300 may include a SCTP common header and at least one chunk. The SCTP common header may be referred to as a packet header. The SCTP common header may include a source port field, a destination port field, an identification tag, and a checksum field. The checksum field may be used to identify whether a packet is corrupted. The checksum field may be assigned a cyclic redundancy check (CRC) value for the values of the remaining parts of the packet. The CRC may be calculated through, e.g., the Sarwate algorithm, but is not limited thereto.

At least one chunk may be referred to as a packet payload. Each chunk may include a type field, a flag field, a length field, and a chunk data field. The type field, flag field, and length field may be referred to as a payload header, and the chunk data field may be referred to as payload data. The number of at least one chunk included in the SCTP packet 300 may vary for each packet. In other words, as the number of at least one chunk varies, the size of the packet payload may vary, and so can the size of the SCTP packet 300.

The structure of the SCTP packet illustrated in FIG. 3 is illustrative, and specific fields may be deleted or added as needed.

Layer 4 load balancing requires changes to the source port and destination port, which means that the value of the checksum field must also be changed. To obtain the value of the changed checksum field, after the values of the source port and destination port of the packet are changed, the CRC for the changed packet must be calculated. When XDP is adopted to enhance the speed of load balancing, calculation of the CRC for the changed packet must be implemented in eBPF. However, because conventional algorithms include loops with a length proportional to the length of the processed packet, and loops with a dynamical size are not allowed, the conventional algorithms cannot be used due to limitations of eBPF.

The above information is presented as background information only to assist with an understanding of the disclosure. No determination has been made, and no assertion is made, as to whether any of the above might be applicable as prior art with regard to the disclosure.

DISCLOSURE OF INVENTION

Solution to Problems

Aspects of the disclosure are to address at least the above-mentioned problems and/or disadvantages and to provide at least the advantages described below. Accordingly, an aspect of the disclosure is to provide a method and device capable of efficiently modifying the source or destination of a packet in a load balancer.

Another aspect of the disclosure is to provide a method and device for modifying the source or destination of a packet applicable to eBPF.

Another aspect of the disclosure is to provide a method and device capable of easily modifying a part of a packet.

Another aspect of the disclosure is to provide a method and device capable of simply obtaining the CRC of a partially modified packet.

Additional aspects will be set forth in part in the description which follows and, in part, will be apparent from the description, or may be learned by practice of the presented embodiments.

In accordance with an aspect of the disclosure, a method for processing a packet by an electronic device is provided. The method includes identifying a first packet including a first part, a second part, and a cyclic redundancy check (CRC) part, obtaining a second value by modifying a first value of the first part of the first packet, obtaining a third value by performing an exclusive or (XOR) operation on the first value and the obtained second value, obtaining a fourth value which is a CRC value for the obtained third value, obtaining a fifth value which is a CRC value corresponding to concatenation of zeros of a number corresponding to a length of the second part of the first packet and the third value based on the length of the second part of the first packet and the obtained fourth value, obtaining a sixth value by performing an XOR operation on a value of a CRC part of the first packet and the obtained fifth value, and generating a second packet including a first part having the second value, a second part identical to the second part of the first packet, and a CRC part having the sixth value.

In the method, obtaining the second value includes modifying a part corresponding to a destination of the first packet, of the first value, to correspond to another destination.

The method further includes transmitting the second packet to the other destination.

A CRC value for 0 may be 0.

For each of the first packet and the second packet, the CRC part may be positioned between the first part and the second part.

For each of the first packet and the second packet, the first part may correspond to a packet header, and the second part may correspond to a packet payload.

The method further includes generating a temporary packet including a first part having the third value, a second part having a value of zeros of a number corresponding to a length of the second part of the first packet, and a CRC part having the fifth value.

The electronic device may be a load balancer using an extended Berkeley packet filter (eBPF).

Obtaining the fifth value includes obtaining the fifth value by referring to at least one matrix defining a relationship between a plurality of candidate lengths of the second part, a plurality of candidate values for the fourth value, and a plurality of candidate values for the fifth value.

The at least one matrix may be stored in advance.

The at least one matrix includes a plurality of matrices each of which corresponds to a different candidate length of the second part.

In accordance with another aspect of the disclosure, a method for processing a packet by a load balancer is provided. The method includes receiving the packet from a client, changing, through an extended Berkeley packet filter (eBPF) the received packet by changing a CRC and at least one of a source or a destination of the received packet, and transmitting the changed packet to a server, wherein the changed CRC is based on the changed at least one of the source or the destination, the CRC of the received packet, and a length of a packet payload of the received packet.

The method includes changing the packet header by changing at least one of the source or the destination in the packet header of the received packet, performing a first exclusive or (XOR) operation on the packet header of the received packet and the changed packet header, obtaining a first CRC on a result of the first XOR operation, obtaining a second CRC for concatenation of a block of zeros of a number corresponding to a length of the packet payload of the received packet and the result of the first XOR operation, and obtaining the changed CRC by performing a second XOR operation on the CRC of the received packet and the second CRC.

The second CRC may be obtained based on at least one matrix defining a relationship between a plurality of candidate values for packet payloads of the received packet, a plurality of candidate values for the first CRC, and a plurality of candidate values for the second CRC.

In accordance with another aspect of the disclosure, an electronic device for processing a packet is provided. The electronic device includes memory storing one or more computer programs and communicatively coupled to the memory, wherein the one or more computer programs include computer-executable instructions that, when executed by the one or more processors, cause the electronic device to identify a first packet including a first part, a second part, and a cyclic redundancy check (CRC) part, obtain a second value by modifying a first value of the first part of the first packet, obtain a third value by performing an exclusive or (XOR) operation on the first value and the obtained second value, obtain a fourth value which is a CRC value for the obtained third value, obtain a fifth value which is a CRC value corresponding to concatenation of the third value and a number of zeros corresponding to a length of the second part of the first packet, based on the length of the second part of the first packet and the obtained fourth value, obtain a sixth value by performing an XOR operation on a value of a CRC part of the first packet and the obtained fifth value, and generate a second packet including a first part having the second value, a second part which is the same as the second part of the first packet, and a CRC part having the sixth value.

In accordance with another aspect of the disclosure, an electronic device for processing a packet is provided. The electronic device includes memory and a controller connected to the memory. The controller may be configured to receive the packet from a client, change the received packet by changing at least one of a source or a destination of the received packet and a cyclic redundancy check (CRC) through an extended Berkeley packet filter (eBPF), and transmit the changed packet to a server. The changed CRC may be based on changed at least one of the source or the destination, a CRC of the received packet, and a length of a packet payload of the received packet.

In accordance with another aspect of the disclosure, one or more non-transitory computer-readable storage media storing one or more computer programs including computer-executable instructions that, when executed by one or more processors of an electronic device, cause the electronic device to perform operations are provided. The operations include identifying a first packet including a first part, a second part, and a cyclic redundancy check (CRC) part, obtaining a second value by modifying a first value of the first part of the first packet, obtaining a third value by performing an exclusive or (XOR) operation on the first value and the obtained second value, obtaining a fourth value which is a CRC value for the obtained third value, obtaining a fifth value which is a CRC value corresponding to concatenation of the third value and a number of zeros corresponding to a length of the second part of the first packet, based on the length of the second part of the first packet and the obtained fourth value, obtaining a sixth value by performing the XOR operation on a value of a CRC part of the first packet and the obtained fifth value, and generating a second packet including a first part having the second value, a second part identical to the second part of the first packet, and a CRC part having the sixth value.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 3 illustrates the structure of an example SCTP packet according to the related art;

Throughout the drawings, it should be noted that like reference numbers are used to depict the same or similar elements, features, and structures.

MODE FOR THE INVENTION

Figure 1:
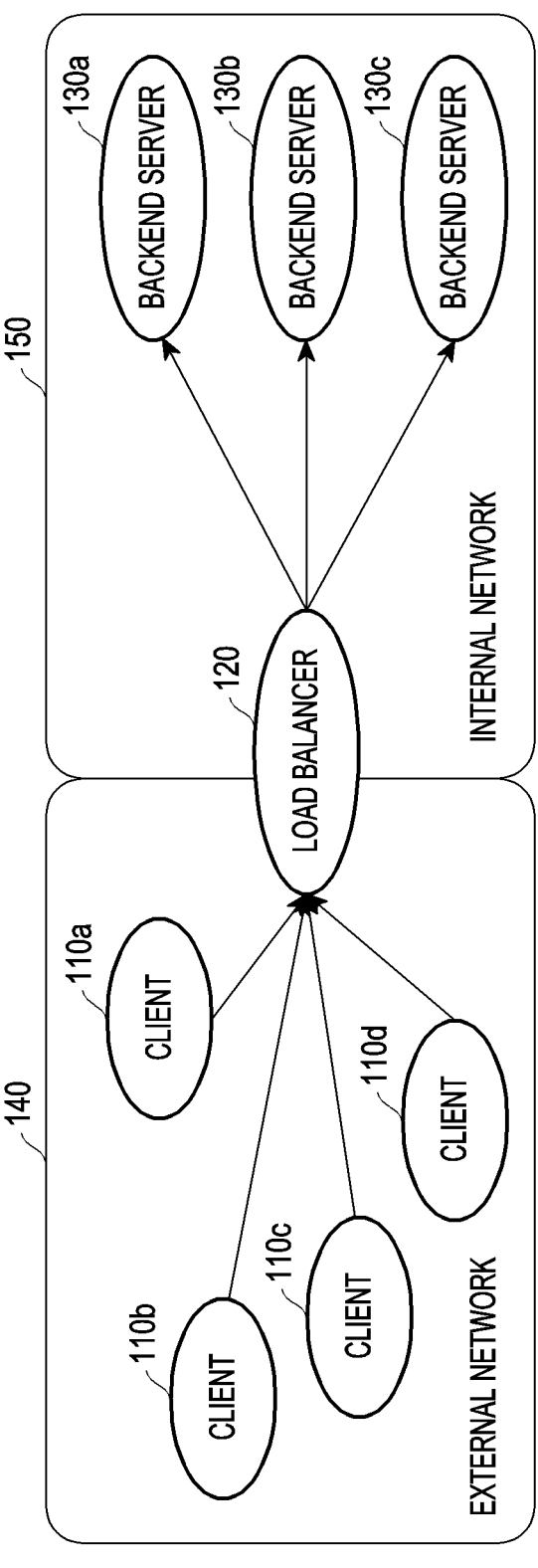
FIG. 1 illustrates an example system using a load balancer according to the related art.
Figure 2:
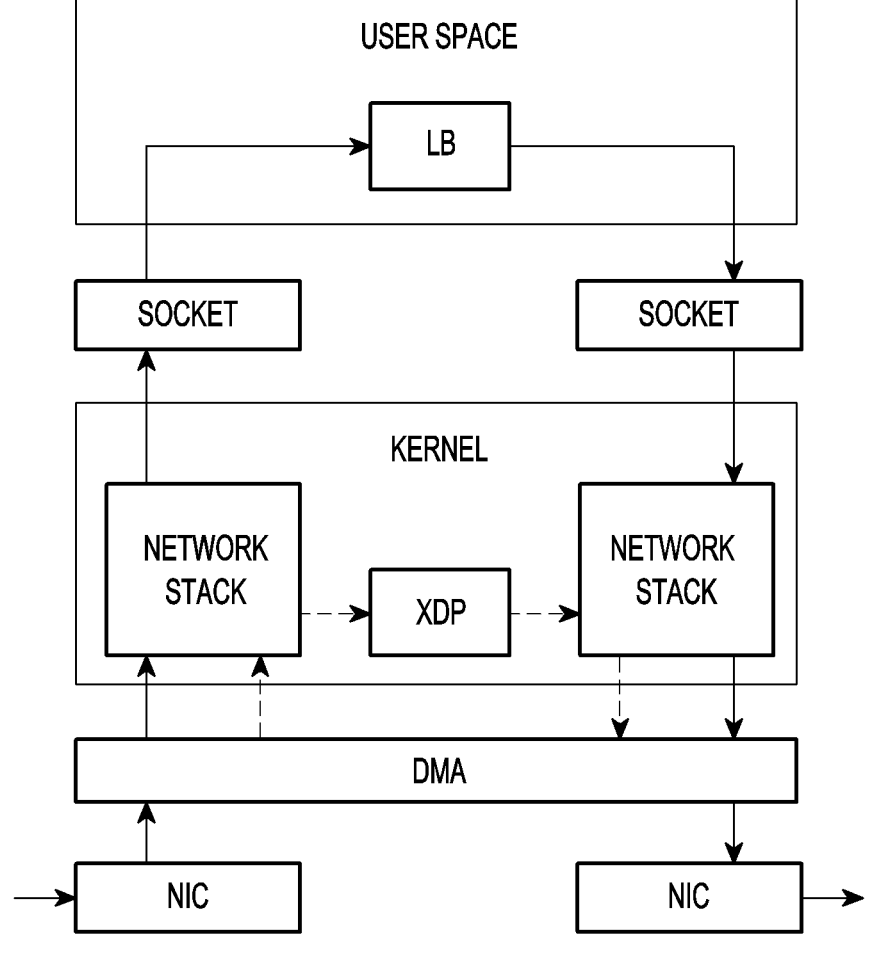
FIG. 2 illustrates an example load balancer according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms coming with ordinal numbers such as 'first' and 'second' may be used to denote various components, but the components are not limited by the terms. The terms are used to distinguish one component from another. For example, a first component may be denoted a second component, and vice versa without departing from the scope of the disclosure. The term "and/or" may denote a combination(s) of a plurality of related items as listed or any of the items.

The terms as used herein are provided merely to describe some embodiments thereof, but not to limit the disclosure. As used herein, the singular forms "a," "an," and "the" are intended to include the plural forms as well, unless the context clearly indicates otherwise. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

Unless otherwise defined in connection with embodiments of the disclosure, all terms including technical and scientific terms used herein have the same meaning as commonly understood by one of ordinary skill in the art to which the embodiments of the disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a micropro-cessor unit (MPU), a system on chip (SoC), an integrated circuit (IC), or the like.

Figure 4:
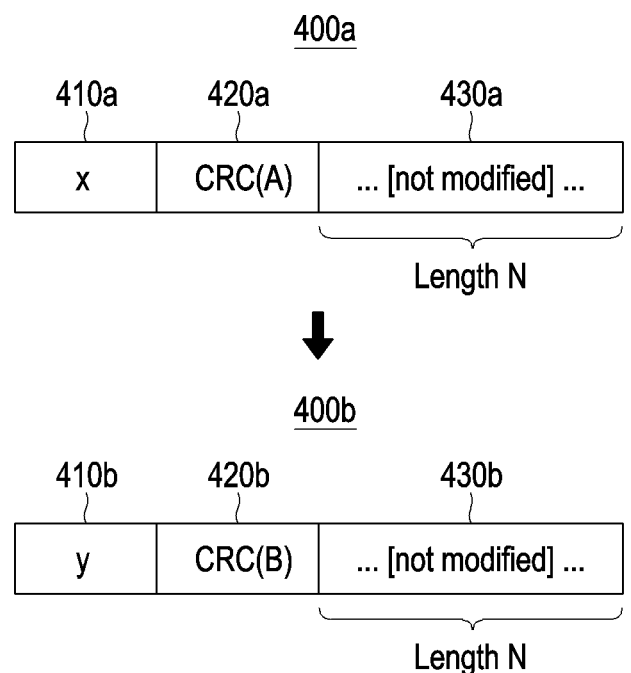
FIG. 4 illustrates a modification to a packet according to an embodiment of the disclosure.

FIG. 4 illustrates a modification to a packet according to an embodiment of the disclosure.

A first packet 400*a* may be modified into a second packet 400*b*. The first packet 400*a* may include a first part 410*a*, a second part 430*a*, and a CRC part 420*a*. The second packet 400*b* may include a first part 410*b*, a second part 430*b*, and a CRC part 420*b*. The CRC part 420*a* or 420*b* may be positioned in the first part 410a or 410b and the second part 430a or 430b, but is not necessarily limited thereto, and the arrangement of the parts in the packet may be changed.

The first part 410a or 410b may correspond to a packet header or a part of the packet header, but is not necessarily limited thereto. The first part 410a or 410b may be a part whose value is changed when the packet is modified and, when the source port field or destination field is modified in the load balancer for load balancing, may be the packet header or a part of the packet header including the source port field or destination field. When the packet payload is modified, the first part may be a packet payload or a part of the packet payload including the modified part. The value of the first part 410a of the first packet 400a may be changed, e.g., from x to y in the first part 410b of the second packet 400b. This change may be due to modification of the source port field or the destination port field as described above, but is not necessarily limited thereto.

The second part 430a or 430b may correspond to a packet payload or a part of the packet payload, but is not necessarily limited thereto, and may refer to a part that is not modified when the packet is modified. When the first packet 400a is modified into the second packet 400b, the values of the second parts 430a and 430b are not changed.

The CRC part 420a of the first packet 400a may include a CRC value (i.e., CRC(A)) for the first packet 400a. The CRC value for the first packet 400a may be obtained from values of remaining parts of the first packet 400a except for the CRC part 420a.

The CRC part 420b of the second packet 400b may include a CRC value (i.e., CRC(B)) for the second packet 400b. The CRC B may correspond to CRC values for remaining parts of the second packet 400b except for the CRC part 420b.

Figure 5:
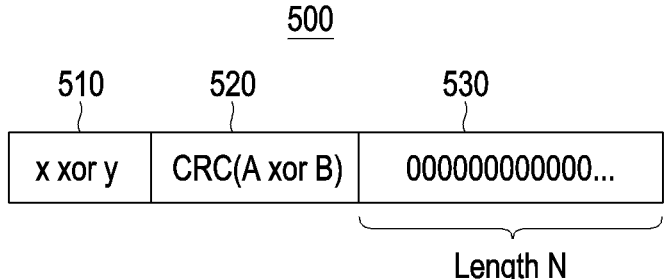
FIG. 5 illustrates a temporary packet according to an embodiment of the disclosure.

FIG. 5 illustrates a temporary packet according to an embodiment of the disclosure.

According to an embodiment of the disclosure, a temporary packet 500 may be generated while modifying the first packet 400a into the second packet 400b. The temporary packet 500 may correspond to a packet obtained by performing an exclusive or (XOR) operation on the first packet 400a and the second packet 400b. The temporary packet 500 may include a first part 510, a second part 530, and a CRC part 520.

The value of the first part 510 of the temporary packet 500 may be obtained by performing an XOR operation on the value x of the first part 410a of the first packet 400a and the value y of the first part 410b of the second packet 400b. In other words, in order to obtain the value of the first part 510 of the temporary packet 500, after obtaining the value y of the first part 410b of the second packet 400b by modifying the value x of the first part 410a of the first packet 400a, the value x of the first part 410a of the first packet 400a and the value y of the first part 410b of the second packet 400b may be XORed.

The value of the second part 530 of the temporary packet 500 may be obtained by performing an XOR operation on the value of the second part 430a of the first packet 400a and the value of the second part 430b of the second packet 400b. Since the value of the second part 430a of the first packet 400a is the same as the value of the second part 430b of the second packet 400b, the value of the second part 530 of the temporary packet 500 obtained by performing an XOR operation on them may be at least one zero. Here, the number N of zeros may be the same as the length (i.e., N bits) of the second part 430a of the first packet 400a and the second part 430b of the second packet 400b.

The value of the CRC part 520 of the temporary packet 500 may be a CRC value for the value of the first part 510 of the temporary packet 500 and the value of the second part 530 of the temporary packet 500. When the CRC for 0 is 0 (i.e., CRC(0)=0), Equation 1 is established.

$$CRC(A) \times or\ CRC(B) = CRC(A \times or\ B) \qquad \text{Equation 1}$$

According to Equation 1, the value of the CRC part 520 of the temporary packet 500 may be the same as the value obtained by performing an XOR operation on the value of the CRC part 420a of the first packet 400a and the value of the CRC part 420b of the second packet 400b.

According to an embodiment of the disclosure, in order to obtain the value of the CRC part 520 of the temporary packet 500, the following method may be used instead of applying the CRC to all of the value of the first part 510 of the temporary packet 500 and the value of the second part 530 of the temporary packet 500.

First, a value (i.e., CRC(x xor y)) obtained by applying the CRC only to the first part 510 of the temporary packet 500 may be obtained.

Next, the CRC value (i.e., CRC(x xor y)) for the first part 510 of the temporary packet 500 may be modified in consideration of N zeros of the second part 530 of the temporary packet 500. This modification may be made through a known CRC concatenation technology. For example, the following Equation 2 may be used.

$$\text{Equation 2}$$

$$CRC_0(g_K(x),\ CRC_0(M(x),\ v(x))) =$$

$$= \left(CRC_0(M(x),\ v(x)) \cdot x^{NW} + g_K(x) \cdot x^D\right) \bmod P(x) =$$

$$= \left(x^{NW} \sum_{n=0}^{N-1} v_{K,n}(x) \cdot x^{-nW} + x^D \sum_{n=0}^{N-1} m_{K,n}(x) \cdot x^{(N-1-n)W}\right) \bmod P(x) =$$

$$= \left(x^{W} \sum_{n=0}^{N-1} v_{K,n}(x) \cdot x^{(N-1-n)W} + x^D \sum_{n=0}^{N-1} m_{K,n}(x) \cdot x^{(N-1-n)W}\right) \bmod P(x)$$

$$= P(x) = \sum_{n=0}^{N-1} \left(v_{K,n}(x) \cdot x^{W} + m_{K,n}(x) \cdot x^{D}\right) \cdot x^{(N-1-n)W} \bmod P(x) =$$

$$= \sum_{n=0}^{N-1} CRC_0(m_{K,n}(x),\ v_{K,n}(x)) \cdot x^{(N-1-n)W} \bmod P(x).$$

Here, it is assumed that $g_K(x)$ is positioned subsequent to M(x). In other words, M(x) corresponds to the value of the first part 510 of the temporary packet 500, and $g_K(x)$ corresponds to the value of the second part 530 of the temporary packet 500. M(x) may be expressed by Equation 3, and if M(x) is expressed by binary, the value of x may be 2.

$$M(x) = \sum_{k=0}^{N-1} m_k x^{N-1-k} \qquad \text{Equation 3}$$

N in Equation 3 denotes the length of M(x) and may be different from the length N of the second part 430a, 430b, or 530 described above.

v(x) may be an arbitrary initial CRC value. P(x) is a specific polynomial used to calculate CRC, and D is the degree of P(x).

Since $CRC_0(M(x), v(x))$ is the CRC value for the first part 510 of the temporary packet 500 and is already obtained, $g_K(x)$ is a block of N zeros, and P(x) is known, the value of the CRC part 520 of the temporary packet 500 may be obtained from the block of N zeros in $g_K(x)$ and the CRC value for the first part 510 of the temporary packet 500 through Equation 2 above.

According to an embodiment of the disclosure, candidate values of the CRC part 520 of the temporary packet 500 may be previously calculated and stored. For example, there may be stored at least one matrix defining the relationship between candidate CRC values (i.e., candidate values of an XOR operation on the value of the first part 410a of the first packet 400a and the value of the first part 410b of the second packet 400b) for the first part 510 of the temporary packet 500, candidate values for N (i.e., the length of the second part 430a of the first packet 400a) which is the number of zeros of the block of at least one zero of the second part 530 of the temporary packet 500, and candidate values of the CRC part 520 of the temporary packet 500. It is possible to omit the operation on the value of the CRC part 520 of the temporary packet 500 by referring to at least one matrix pre-calculated and stored, thereby enhancing the efficiency of packet processing.

According to an embodiment, at least one matrix stored may define the relationship between the candidate CRC values for the first part 510 of the temporary packet 500, candidate values for the length of the first packet 400a, and candidate values of the CRC part 520 of the temporary packet 500. When the length of the first part 410a of the first packet 400a and the length of the CRC part 420a are fixed, the value of N may be derived from the length of the first packet 400a.

According to an embodiment, at least one matrix may define the relationship between candidate values for the first part 510 of the temporary packet 500 and candidate values of the CRC part 520 of the temporary packet 500.

According to an embodiment, at least one matrix may define the relationship between candidate values for the first part 510 of the temporary packet 500, candidate values for the length of the first packet 400a, and candidate values of the CRC part 520 of the temporary packet 500.

According to an embodiment, at least one matrix described above may include a plurality of matrices, and the plurality of matrices, respectively, may correspond to the candidate values for N or the candidate values for the length of the first packet 400a.

The value of the CRC part 520 of the temporary packet 500 may be the same as the CRC value (i.e., CRC (A xor B)) for an XOR operation on the first packet 400a and the second packet 400b. Accordingly, the value CRC(B) of the CRC part 420b of the second packet 400b may be obtained by performing an XOR operation (i.e., CRC(A) xor CRC(A xor B)) on the value CRC(A) of the CRC part 420a of the first packet 400a and value CRC(A xor B) of the CRC part 520 of the temporary packet 500.

The second packet 400b may be obtained by modifying the so-obtained value of the CRC part 420 of the first packet 400a into the value of the CRC part 420b of the second packet 400b and modifying the value of the first part 410a of the first packet 400a into a desired value.

According to an embodiment, the temporary packet 500 may not be generated. Even if the temporary packet 500 is not actually generated, the value of the first part 510, the value of the CRC part 520, and the number of zeros included in the second part 530 of the temporary packet 500 may be identified, and thus the second packet 400b may be generated from the first packet 400a by using these values.

According to the packet modification method described in FIGS. 4 and 5, CRC calculation may be executed only on the first part (i.e., the first part 510 of the temporary packet 500) having a fixed length or, if at least one matrix using candidate values for the first part 510 of the temporary packet 500, instead of the candidate CRC values for the first part 510 of the temporary packet 500, is referred to, no CRC calculation may be executed. Therefore, the packet modification method of the disclosure may be applicable to an eBPF incapable of CRC calculation on packets having a variable length due to incapability of having loops in an undefined scope. Accordingly, the efficiency of packet processing of a load balancer using an EBPF may be enhanced.

The load balancer using the eBPF may receive a packet and, when determining that it is required to change at least one of the source or destination of the received packet, change the received packet using the above-described packet modification method. For example, when determining that at least one of the source or destination of the received packet needs to be changed, the load balancer may obtain a CRC for the packet header according to the change of at least one of the source or destination of the packet, a block of a number of zeros corresponding to the length of the packet payload of the received packet, and a CRC for the packet changed based on the CRC of the packet. To obtain the CRC for the changed packet, the load balancer may obtain a CRC corresponding to concatenation of the block of zeros and the changed packet header based on the block of the zeros and the CRC for the changed packet header and perform an XOR operation on the CRC of the packet and the CRC corresponding to the concatenation of the block of the zeros and the changed packet header to thereby obtain the CRC for the changed packet. The load balancer may transmit the obtained CRC for the changed packet.

The packet modification method according to embodiments of the disclosure may be used in any device requiring a modification of a part of a packet, as well as a load balancer, and facilitate CRC calculation of the changed packet, thereby enhancing the efficiency of packet processing. The modified part of the packet is not limited only to the header of the packet, but the disclosure may also apply even when the payload of the packet is modified.

Figure 6:
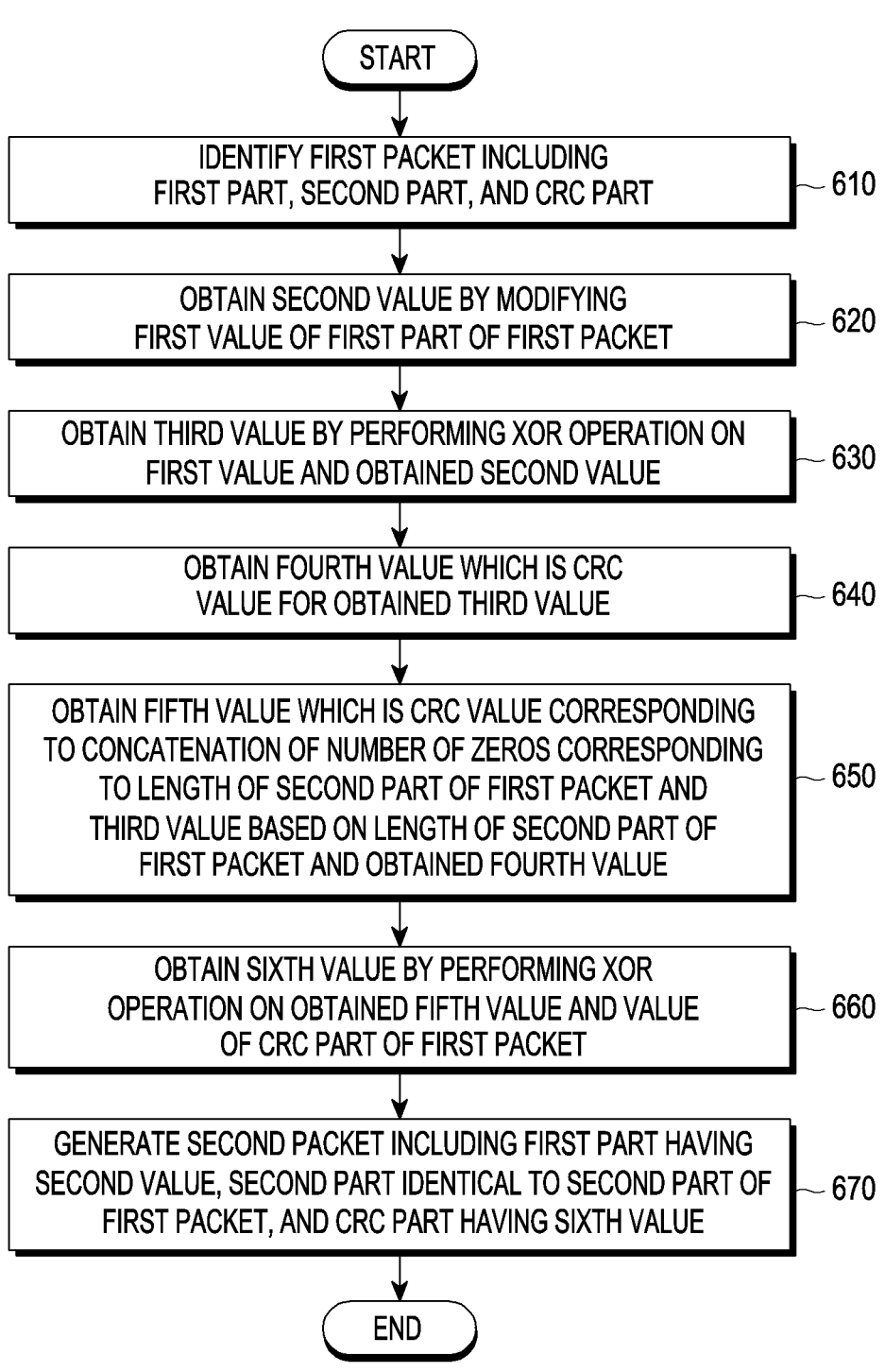
FIG. 6 is a flowchart illustrating a method for processing a packet according to an embodiment of the disclosure.

FIG. 6 is a flowchart illustrating a method for processing a packet according to an embodiment of the disclosure. The method of FIG. 6 may be executed by an electronic device.

In operation 610, the electronic device may identify a first packet including a first part, a second part, and a CRC part.

According to an embodiment, the first part of the first packet may correspond to the packet header or at least a part of the packet header. The second part of the first packet may correspond to the packet payload.

According to an embodiment, the first part of the first packet may be a part having a fixed length. The second part of the first packet may be a part having a variable length.

The CRC part of the first packet may include a CRC value of the first packet. The CRC value of the first packet may be calculated from the values of the remaining parts (i.e., the first part and the second part) of the first packet except for the CRC part.

The electronic device may obtain a second value by modifying a first value of the first part of the first packet in operation 620.

According to an embodiment, when the first part of the first packet corresponds to the packet header, the second value may be obtained by modifying the part corresponding to the destination and/or the source of the packet header.

The electronic device may obtain a third value by performing an XOR operation on the first value and the obtained second value in operation 630.

The electronic device may obtain a fourth value which is a CRC value for the obtained third value. The electronic device may perform a CRC operation on the third value to obtain the fourth value.

In operation 640, the electronic device may obtain a fifth value which is a CRC value corresponding to concatenation of zeros of a number corresponding to a length of the second part of the first packet and the third value based on the length of the second part of the first packet and the obtained fourth value.

According to an embodiment, the fifth value may be obtained by an operation, such as Equation 2.

According to an embodiment, the fifth value may be obtained by referring to at least one matrix previously calculated and stored.

According to an embodiment, at least one matrix may define a relationship between candidate values of the fourth value, candidate values of the length of the second part of the first packet (or the number of zeros corresponding to the length of the second part of the first packet), and candidate values of the fifth value.

According to an embodiment, at least one matrix may define a relationship between lengths of candidate values of the fourth value, candidate values of the length of the first packet, and candidate values of the fifth value. In this case, in operation 650, the fifth value may be obtained based on the length of the first packet and the obtained fourth value.

According to an embodiment, at least one matrix may define a relationship between candidate values of the third value, candidate values of the length of the second part of the first packet (or the number of zeros corresponding to the length of the second part of the first packet), and candidate values of the fifth value. In this case, operation 640 may not be executed and, in operation 650, the fifth value may be obtained based on the third value and the length of the second part of the first packet.

According to an embodiment, at least one matrix may define a relationship between candidate values of the third value, candidate values of the length of the first packet, and candidate values of the fifth value. In this case, operation 640 may not be executed and, in operation 650, the fifth value may be obtained based on the third value and the length of the first packet.

According to an embodiment, at least one matrix described above may include a plurality of matrices, and the plurality of matrices, respectively, may correspond to the candidate values for the length of the second part of the first packet or the candidate values for the length of the first packet.

The electronic device may obtain a sixth value by performing an XOR operation on a value of a CRC part of the first packet and the obtained fifth value in operation 660.

The electronic device may generate a second packet including a first part having the second value, a second part identical to the second part of the first packet, and a CRC part having the sixth value in operation 670.

Here, generating the second packet may include not only newly generating the second packet but also modifying the first packet into the second packet by modifying the value of the first part of the first packet into the second value and modifying the value of the CRC part of the first packet into the sixth value.

The electronic device may transmit the generated second packet. When the part corresponding to the destination of the first packet is changed, the electronic device may transmit the second packet to the changed destination.

Figure 7:
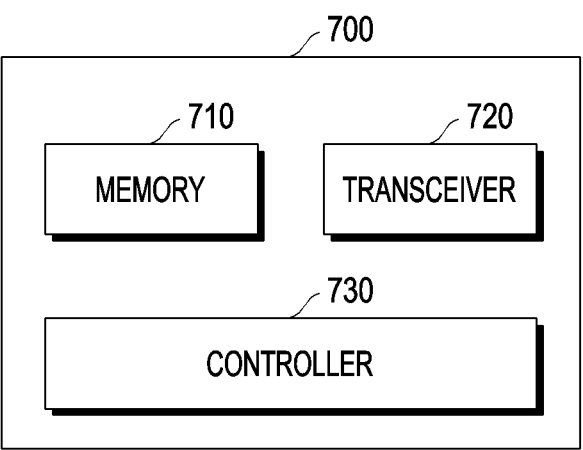
FIG. 7 illustrates an electronic device according to an embodiment of the disclosure.

FIG. 7 illustrates an electronic device according to an embodiment of the disclosure.

The electronic device 700 may be a load balancer or a computing device implementing a load balancer but is not necessarily limited thereto, and may be any electronic device requiring packet processing.

An electronic device 700 may include memory 710, a transceiver 720, and a controller 730.

The memory 710 may store at least one of information transmitted and/or received through the transceiver 720 and information generated through the controller 730. The memory 710 may additionally store information/data/commands/instructions to be executed by the controller 730 so that the electronic device 700 performs the operations described herein. The memory 710 may also be referred to as a non-transitory computer-readable storage medium.

The transceiver 720 may be used to transmit signals from the controller 730 to other entities or to receive signals from other entities. The transceiver 720 may support communication through various radio access technologies (RATs) including, e.g., long term evolution (LTE), wireless fidelity (Wi-Fi), orthogonal frequency division multiplexing (OFDM), code divisional multiple access (CDMA), and Bluetooth, and the RATs supported by the transceiver 720 are not limited thereto.

The controller 730 may control operations of other elements of the electronic device 700. It may be understood that the operations of the electronic device 700 are substantially executed by the controller 730. The controller 730 may be implemented through at least one processor. The controller may execute instructions stored in the memory 710 to perform the operations of the electronic device 700 described herein.

Figure 8:
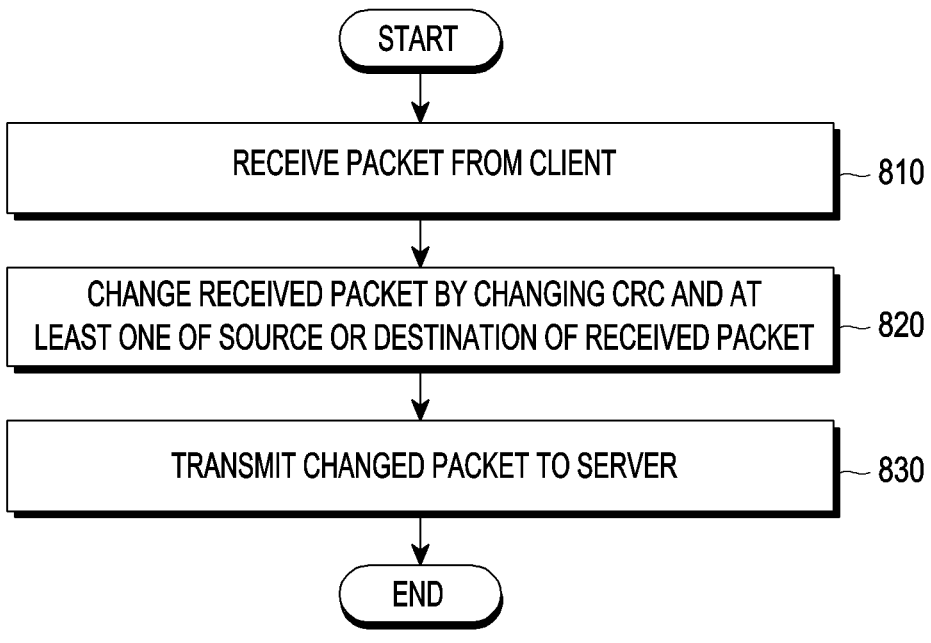
FIG. 8 is a flowchart illustrating a method for processing a packet according to an embodiment of the disclosure.

FIG. 8 is a flowchart illustrating a method for processing a packet according to an embodiment of the disclosure. The method of FIG. 8 may be executed by an electronic device, and the electronic device may be a network entity (e.g., a load balancer).

The electronic device may receive a packet from the client in operation 810.

The electronic device may change the received packet by changing at least one of the source or destination of the received packet and the CRC in operation 820. The electronic device may change the packet received through the eBPF. The eBPF may be included in the XDP of the electronic device.

The changed CRC may be based on changed at least one of the source or the destination, a CRC of the received packet, and a length of a packet payload of the received packet.

To obtain the changed CRC, the electronic device may change the packet header by changing at least one of the source or destination in the packet header of the received packet, performing a first XOR operation on the packet header of the received packet and the changed packet header, obtain a first CRC for the result of the first XOR operation, obtain a second CRC for concatenation of a block of a number of zeros corresponding to the length of the packet payload of the received packet and the result of the first XOR operation, and perform a second XOR operation on the CRC of the received packet and the second CRC to thereby obtain the changed CRC.

The electronic device may obtain the second CRC based on at least one matrix defining a relationship between a plurality of candidate values for packet payloads of the received packet, a plurality of candidate values for the first CRC, and a plurality of candidate values for the second CRC.

The electronic device may transmit the changed packet to a server (e.g., a backend server) in operation 830. The server to which the packet is transmitted may respond to the changed destination.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for processing a packet by an electronic device, the method comprising:

identifying a first packet including a first part, a second part, and a cyclic redundancy check (CRC) part;

obtaining a second value by modifying a first value of the first part of the first packet;

obtaining a third value by performing a first exclusive or (XOR) operation on the first value and the obtained second value;

obtaining a fourth value which is a CRC value for the obtained third value;

obtaining a fifth value which is a CRC value corresponding to concatenation of the third value and a number of zeros corresponding to a length of the second part of the first packet, based on the length of the second part of the first packet and the obtained fourth value;

obtaining a sixth value by performing a second XOR operation on a value of the CRC part of the first packet and the obtained fifth value; and generating a second packet including a first part having the second value, a second part which is the same as the second part of the first packet, and a CRC part having the sixth value.

2. The method of claim 1, wherein obtaining the second value comprises modifying a part of the first value, corresponding to a destination port of the first packet to correspond to a different destination port.

3. The method of claim 2, further comprising:

transmitting the second packet to the different destination port.

4. The method of claim 1, wherein a CRC value for zero is zero.

5. The method of claim 1, wherein, for each of the first packet and the second packet, the CRC part is located between the first part and the second part.

6. The method of claim 1, wherein, for each of the first packet and the second packet, the first part corresponds to a packet header, and the second part corresponds to a packet payload.

7. The method of claim 1, further comprising:

generating a temporary packet including a first part having the third value, a second part having the number of zeros corresponding to the length of the second part of the first packet, and a CRC part having the fifth value.

8. The method of claim 1, wherein the electronic device is a load balancer using an extended berkeley packet filter (eBPF).

9. The method of claim 1, wherein obtaining the fifth value comprises:

obtaining the fifth value by referring to at least one matrix defining a relationship between a plurality of candidate lengths of the second part, a plurality of candidate values for the fourth value, and a plurality of candidate values for the fifth value.

10. The method of claim 9, wherein the at least one matrix is pre- stored.

11. The method of claim 10, wherein the at least one matrix comprises a plurality of matrices each corresponding to a different candidate length of the second part.

12. A method for processing a packet by a load balancer, the method comprising:

receiving a packet from a client;

changing, through an extended berkeley packet filter (eBPF), the received packet by changing a cyclic redundancy check (CRC) and at least one of a source port or a destination port of the received packet; and transmitting the changed packet to a server, wherein the changed CRC is based on an operation performed on an intermediate CRC and the CRC of the received packet, wherein the intermediate CRC is based on the changed at least one of the source port or the destination port concatenated with a block of zeros, and wherein the number of zeros in the block of zeros is based on a length of a packet payload of the received packet.

13. The method of claim 12, further comprising:

changing a packet header of the received packet by changing at least one of the source port and the destination port;

performing a first exclusive or (XOR) operation on the packet header of the received packet and the changed packet header;

obtaining a first CRC for a result of the first XOR operation;

obtaining the intermediate CRC for concatenation of the result of the first XOR operation and the block of zeros, the number of zeros in the block of zeros corresponding to the length of the packet payload of the received packet; and obtaining the changed CRC by performing a second XOR operation on the CRC of the received packet and the intermediate CRC.

14. The method of claim 13, wherein the intermediate CRC is obtained based on at least one matrix defining a relationship between a plurality of candidate values for the length of the packet payload of the received packet, a plurality of candidate values for the first CRC, and a plurality of candidate values for the intermediate CRC.

15. An electronic device for processing a packet, the electronic device comprising:

memory storing one or more computer programs; and one or more processors communicative coupled to the memory, wherein the one or more computer programs include computer-executable instructions that, when executed by the one or more processors, cause the electronic device to:

identify a first packet including a first part, a second part, and a cyclic redundancy check (CRC) part;

obtain a second value by modifying a first value of the first part of the first packet;

obtain a third value by performing a first exclusive or (XOR) operation on the first value and the obtained second value;

obtain a fourth value which is a CRC value for the obtained third value;

obtain a fifth value which is a CRC value corresponding to concatenation of the third value and a number of zeros corresponding to a length of the second part of the first packet, based on the length of the second part of the first packet and the obtained fourth value;

obtain a sixth value by performing a second XOR operation on a value of the CRC part of the first packet and the obtained fifth value; and generate a second packet including a first part having the second value, a second part which is the same as the second part of the first packet, and a CRC part having the sixth value.

16. The electronic device of claim 15, wherein for obtaining the second value, the computer-executable instructions, when executed by the one or more processors, cause the electronic device to modify a part of the first value, corresponding to a destination port of the first packet to correspond to a different destination port, and wherein the computer-executable instructions, when executed by the one or more processors, cause the electronic device further to transmit the second packet to the different destination port.

17. The electronic device of claim 15, wherein a CRC value for zero is zero.

18. The electronic device of claim 15, wherein, for each of the first packet and the second packet, the CRC part is located between the first part and the second part.

19. The electronic device of claim 15, wherein the one or more computer programs further include computer-executable instructions that, when executed by the one or more processors, cause the electronic device to generate a temporary packet including a first part having the third value, a second part having the number of zeros corresponding to the length of the second part of the first packet, and a CRC part having the fifth value.

20. The electronic device of claim 15, wherein the computer- executable instructions, when executed by the one or more processors, cause the electronic device to obtain the fifth value by referring to at least one matrix defining a relationship between a plurality of candidate lengths of the second part, a plurality of candidate values for the fourth value, and a plurality of candidate values for the fifth value.

* * * * *